United States Patent [19]
Upton et al.

[11] Patent Number: 5,784,695
[45] Date of Patent: Jul. 21, 1998

[54] METHOD AND APPARATUS FOR HANDOVER CONTROL IN A SATELLITE BASED TELECOMMUNICATIONS SYSTEM

[75] Inventors: Eric L. Upton, Redondo Beach; Robert M. Ward, Jr., Poway, both of Calif.

[73] Assignee: TRW Inc., Redondo Beach, Calif.

[21] Appl. No.: 647,506

[22] Filed: May 14, 1996

[51] Int. Cl.$^6$ .................................................. H04Q 7/20
[52] U.S. Cl. .................... 455/442; 455/427; 455/12.1; 455/6.2; 455/13.2; 455/436
[58] Field of Search ................................ 455/12.1, 13.2, 455/33.2, 33.4, 37.1, 54.1, 51.1, 62, 427, 428, 429, 430, 436, 437, 438, 442, 443

[56] References Cited

U.S. PATENT DOCUMENTS

| | | | |
|---|---|---|---|
| 5,109,528 | 4/1992 | Uddenfeldt | 455/442 |
| 5,323,446 | 6/1994 | Kojima et al. | 455/442 |
| 5,327,577 | 7/1994 | Uddenfeldt | 455/442 |
| 5,432,842 | 7/1995 | Kinoshita et l. | 455/442 |
| 5,483,664 | 1/1996 | Moritz et al. | 455/13.1 |
| 5,561,838 | 10/1996 | Chandos et al. | 455/13.1 |
| 5,574,968 | 11/1996 | Olds et al. | 455/12.1 |

OTHER PUBLICATIONS

"An Introduction to GSM", by Siegmund M. Redl, Artech House, 1995.

*Primary Examiner*—Reinhard J. Eisenzopf
*Assistant Examiner*—Darnell R. Armstrong
*Attorney, Agent, or Firm*—Michael S. Yatsko

[57] ABSTRACT

A method and apparatus are provided for controlling mobile and base stations (14 and 16) during satellite (12) based telecommunications to perform scheduled handovers between two communications channels (26 and 27). The base station (16) determines when a handover will be necessary. Once determined, the base station (16) generates a handover scheduling command (node #4) which includes a scheduled handover time representing a time in the future at which the handover will occur. The handover scheduling command is transmitted over the first channel to the mobile station (14). Upon receipt of the handover scheduling command, the mobile station (14) performs steps necessary to establish a second communications link over a second channel (27), prior to the scheduled handover time. At the scheduled handover time (node #21), the mobile and base stations (14 and 16) have established the second communications link on the second channel (27). To establish the second channel the mobile station calculations of the second channels frequency, timing offset and power level (node #11). By using a scheduled handover process, the mobile and base stations (14 and 16) avoid the production of interference and breaks within a conversation transmitted therebetween.

25 Claims, 3 Drawing Sheets

METHOD AND APPARATUS FOR HANDOVER CONTROL IN A SATELLITE BASED TELECOMMUNICATIONS SYSTEM

FIELD OF THE INVENTION

The present invention generally relates to a satellite based telecommunications system and, more specifically, to a control process whereby the mobile and base stations effect seamless handovers between communications channels as mobile stations pass between satellite coverage beams.

BACKGROUND

In recent years, several forms of mobile communications systems have been proposed, such as the GSM system offered in Europe and the ODYSSEY system proposed by the assignee of the present application. These systems offer mobile telecommunications between ground or based stations and mobile stations, such as cellular telephones and the like. In the GSM system, the ground stations communicate directly with any mobile stations located within the ground stations coverage area. The ODYSSEY system proposes a satellite based telecommunications system in which a constellation of telecommunications satellites orbits the earth. The satellites relay communications between the mobile and ground stations (the terms ground stations and based stations are used interchangeably hereafter). Each satellite defines a plurality of communications beams which cooperate to form a coverage area of the earth. The coverage area moves relative to the earth's surface as the satellite orbits the earth. A mobile station communicates with an overhead satellite while in its associated coverage area. The overhead satellite in turn relays the communications to and from a corresponding ground station also within the satellite's coverage area.

The coverage areas are divided into subsections, both in the GSM system and in satellite based systems. By dividing the coverage area into subsections, the system increases the number of available communications channels and thus the overall capacity (i.e., the number of mobile stations which may be supported by the system). In the GSM system, each subsection represents a fixed predefined geographic "cell" upon the surface of the earth. In satellite based systems, each subsection corresponds to a coverage beam which defines a dynamic geographic area which moves across the surface of the earth as the satellite orbits the earth. Each cell or beam in a coverage area is assigned a unique frequency as a carrier for all communications. Each carrier frequency supports multiple channels, with each channel being assigned to a specific mobile station located in the corresponding beam or cell. A mobile station communicates with the ground station at the assigned frequency and on an assigned communications channel so long as the mobile station is within the associated beam/cell.

However, when the mobile station leaves an old beam/cell and enters a new one, the mobile station must be assigned to a new communications channel. Also, the mobile station must adjust its communications frequency to the frequency associated with the new cell. Otherwise, the communications channel (and an ongoing call) will be dropped (i.e., disconnected). Once in the new beam/cell, the mobile station will use the new channel for all communications with the ground station.

The process of switching channels is referred to as a "handover". Handovers are necessary when a mobile station physically moves from one beam or cell to another. Additionally, in satellite based systems, handovers are necessary when the relative motion of the satellite, with respect to a mobile station, causes a corresponding coverage beam spot to pass over the mobile station which may or may not be stationary. To effect a handover, the mobile station must switch to a new transmitter or uplink frequency determined by the ground station. In addition, the ground station must "acquire" the mobile station's new uplink frequency (i.e. establish a communications link at the new frequency). The ground station must also switch the handed over call in the network (i.e., continue transmitting the communications or conversation at the new frequency). Handovers may occur in the middle of a call while conversation is being passed to and from the mobile station.

Conventional mobile communications systems effect handovers as unscheduled events with respect to time. In more detail, when the ground station determines that a handover is necessary, the ground station sends an appropriate command to the mobile station. This command directs the mobile station to immediately switch to the new channel and new frequency without delay. Upon receiving the command, the mobile station switches, and begins to transmit over, the new channel and at the new frequency. The ground station continues to communicate over the old channel but monitors the new channel. Once the ground station detects incoming communications over the new channel, the ground station begins transmitting outgoing communications over the new channel.

However, unscheduled handovers may produce interrupts or interference in a communications link which may be detected as breaks or "clicks" by the parties to a conversation. Such interrupts and interference result when handovers occur in the middle of a telephone conversation while the new channel is established. Conversations are carried over assigned channels as a stream of frames of communications data. When a handover occurs, the stream of communications data is rerouted from the old channel to the new channel. The interruption in the stream of data produces the clicks or breaks in conversation. The magnitude of an interrupt is dependent in part on a "round trip delay time" between the ground and mobile stations (i.e., the time period necessary for a frame of communications data to travel from the ground station to the mobile station and back to the ground station). Such interrupts are not overly disruptive in GSM systems since the round trip delay time is relatively short (e.g., 120 microseconds or less).

However, satellite based systems may experience significantly longer round trip delay times. A frame of communications data must travel from a ground station to a satellite, to a mobile station, back to the satellite and back to the ground station. By way of example, the round trip delay time may be approximately 192 milliseconds. Hence, the interrupts during unscheduled handovers have a significantly greater detrimental effect on calls in satellite based telecommunications systems.

Further, satellite based systems may require more than one frame of communications data to be passed between the ground station and mobile station during the process of establishing a new channel. Hence, the handover process may extend over a time period which is greater than one round trip delay time, thereby further exaggerating the detrimentally effects of the unscheduled handover process.

A need remains in the industry for an improved handover process for use in satellite based telecommunications systems which overcomes the disadvantages experienced heretofore and discussed above. It is an object of the present invention to meet this need.

SUMMARY OF THE INVENTION

It is an object of the present invention to provide a satellite based telecommunications system which minimizes interrupts due to the handover process.

It is a corollary object of the present invention to provide a handover control process which effects seamless handovers.

It is a further object of the present invention to provide a scheduled handover control process to achieve logical acquisition of a new channel prior to reliance on the new channel for the transmission of communications data.

It is another object of the present invention to utilize estimated and calculated time, power and frequency parameters which are transmitted between mobile and ground stations over the current channel to achieve acquisition of a new channel.

It is a further object of the present invention to synchronize the corrected parameter during the handover process, prior to actual handover, supplied by the mobile station to enable faster switching to the new channel.

It is a further object of the present invention to provide a scheduled handover which avoids the detrimental effects of long propagation delays, and which speeds channel acquisition and switching in the handover process.

The above and other objects are achieved by the inventive system. A method and apparatus are provided for controlling mobile and base stations (14 and 16) during satellite (12) based telecommunications to perform scheduled handovers between two communications channels (26 and 27). The base station (16) determines when a handover will be necessary. Once determined, the base station (16) generates a handover scheduling command (node #4) which includes a scheduled handover time representing a time in the future at which the handover will occur. The handover scheduling command is transmitted over the first channel to the mobile station (14). Upon receipt of the handover scheduling command, the mobile station (14) performs steps necessary to establish a second communications link over a second channel (27), prior to the scheduled handover time. At the scheduled handover time (node #21), the mobile and base stations (14 and 16) have established the second communications link on the second channel (27). To establish the second channel, the mobile station calculates the second channels frequency, timing offset and power level (node #11). By using a scheduled handover process, the mobile and base stations (14 and 16) avoid the production of interference and breaks within a conversation transmitted therebetween.

DETAILED DESCRIPTION OF THE PREFERRED EMBODIMENT

Figure 1:
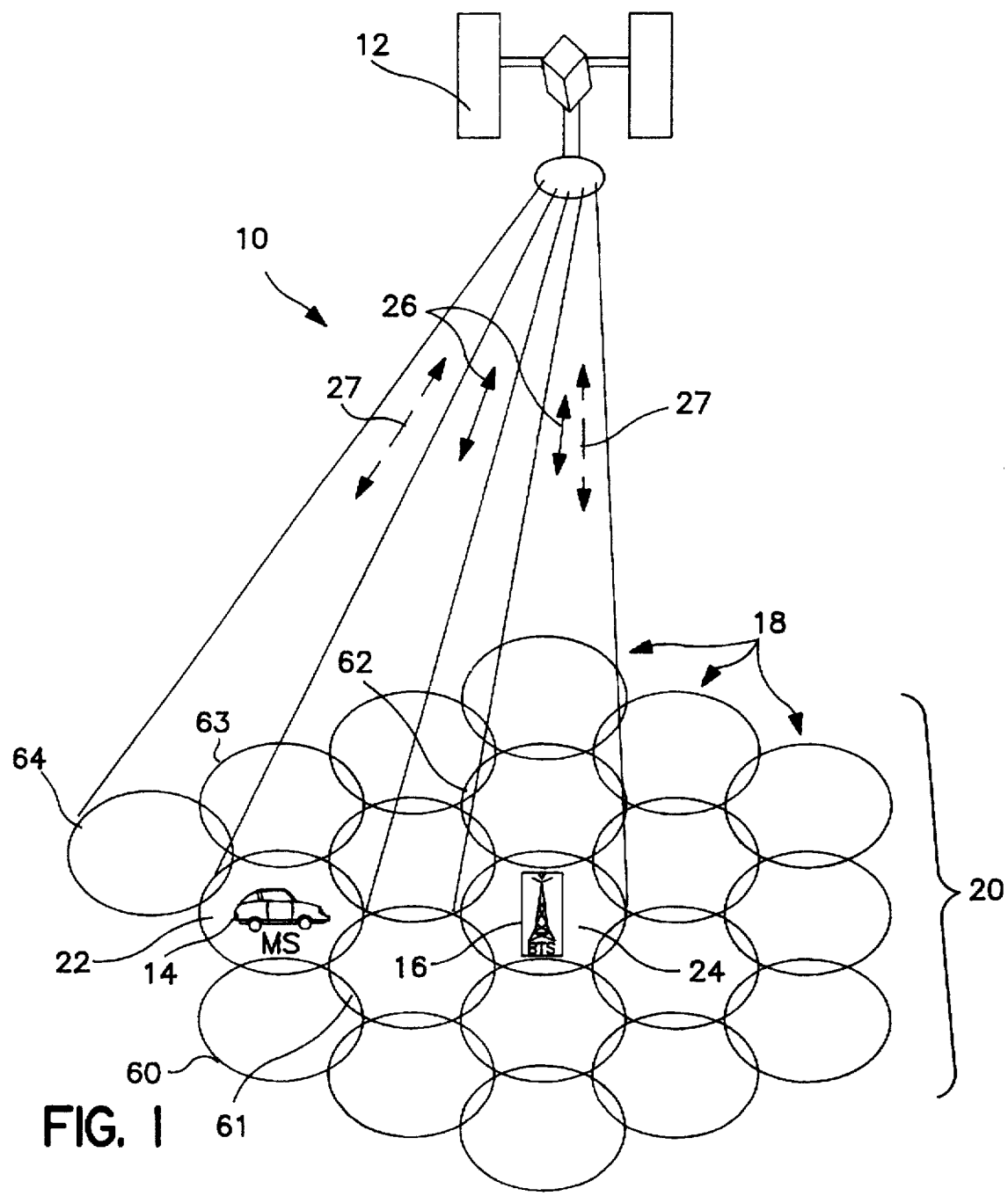
FIG. 1 illustrates a satellite based telecommunications system according to the present invention.

FIG. 1 generally illustrates a satellite based telecommunications system 10 which includes a satellite 12, at least one mobile station (MS) 14 and at least one base or ground station (BS or GS) 16. The satellite 12 emits a plurality of coverage beams 18 which cooperate to define a coverage area 20. As illustrated in FIG. 1, the mobile station 14 is located in coverage beam 22 and the base station 16 is located in coverage beam 24. The mobile station 14 communicates with the base station 16 via the satellite 12. The system 10 may utilize time division multiple access (TDMA), code division multiple access (CDMA) and similar techniques to increase the overall capacity. In more detail, the mobile station 14 transmits and receives frames of communications data to and from the satellite 12 over an assigned communications channel (generally denoted by reference numeral 26). The uplink communications channel has a carrier frequency corresponding to that of the coverage beam 22. The satellite 12 in turn relays the frames of communications data to and from the base station 16 along the same channel 26 at a frequency corresponding to coverage area 24. When the mobile station 14 moves from coverage beam 22 to a different coverage beam (for instance one of beams 60–64), a new communications channel must be assigned to the mobile station 14 and a new communications link must be established. This assignment process is referred to as a handover. A scheduled handover process is explained in more detail below.

Figure 2:
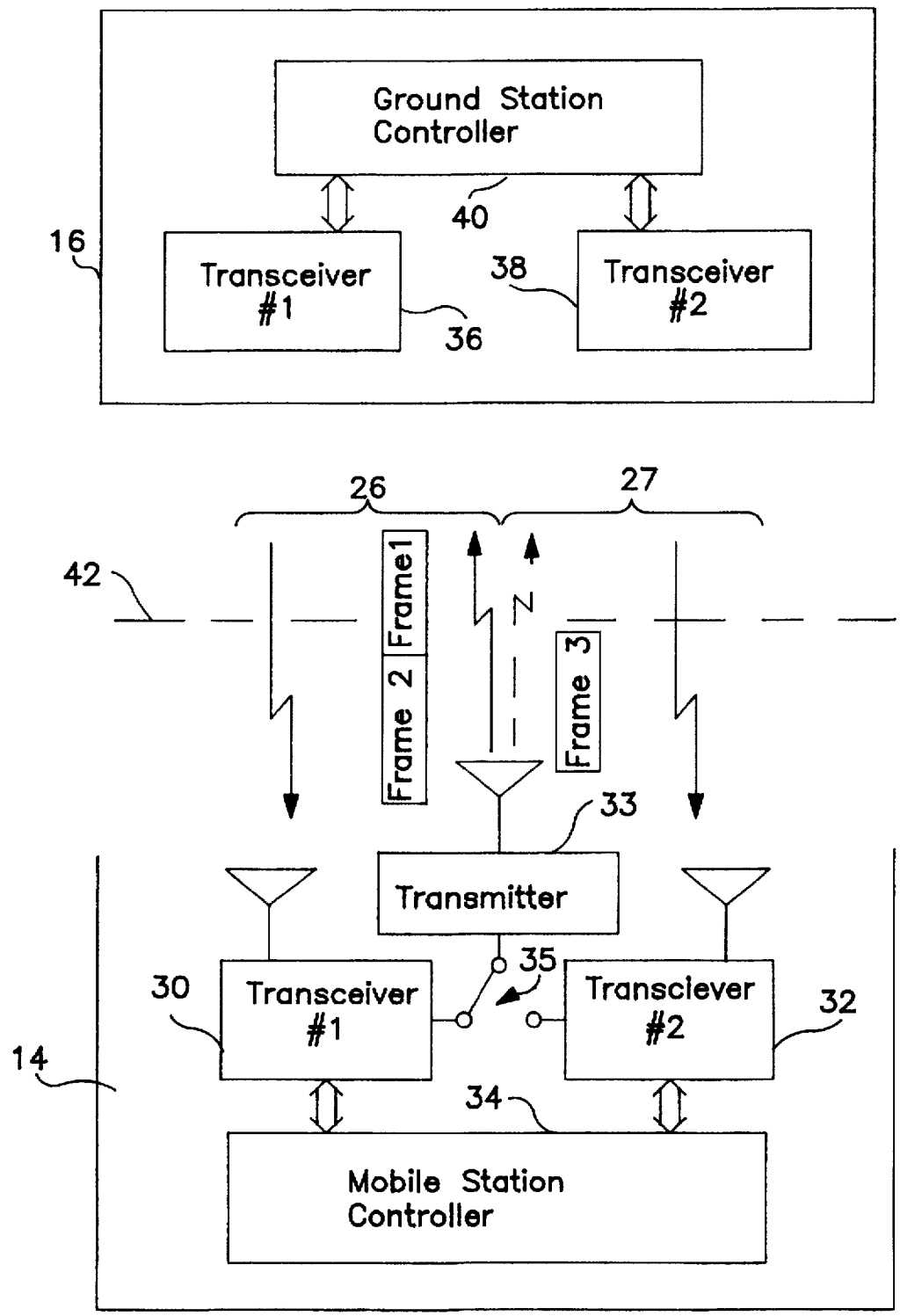
FIG. 2 illustrates, in block diagram form, a mobile station and a ground station communicating with one another according to the present invention.

FIG. 2 illustrates a block diagram of a mobile station 14 and a base station 16. The mobile station may include two transceivers 30 and 32 and a transmitter 33 which are controlled by a controller 34. A switch 35 selectively connects one of transceivers to the transmitter 33. The base station 16 also includes multiple transceivers 36 and 38 which are controlled by a controller 40. It is to be understood that the block diagram in FIG. 2 merely is illustrative of the fact that the base station and the mobile station are capable of communicating with one another over two separate channels 26 and 27. While the transceivers 30 and 32 may simultaneously receive signals over channels 26 and 27, it is understood that the transmitter 33 only transmits over one of channels 26 and 27 at any given instant. Switch 35 selects the output channel. Thus, the path in channel 27 from the transmitter 33 has been represented in dashed lines to illustrate that the transmitter 33 alternately outputs signals over channels 26 and 27. The mobile and base stations 14 and 16 need not necessarily include two physically separate receivers and transmitters. Any conventional devices may be combined in place of the first and second transceivers so long as the mobile and base stations 14 and 16 are capable of simultaneous communication over two channels. The base station 16 is capable of communicating over multiple channels with multiple mobile stations. The dashed line 42 is illustrative of the satellite 12 which functions as a "bent pipe" and simply retransmits frames of communications data received from the mobile station and base station.

Figure 3:
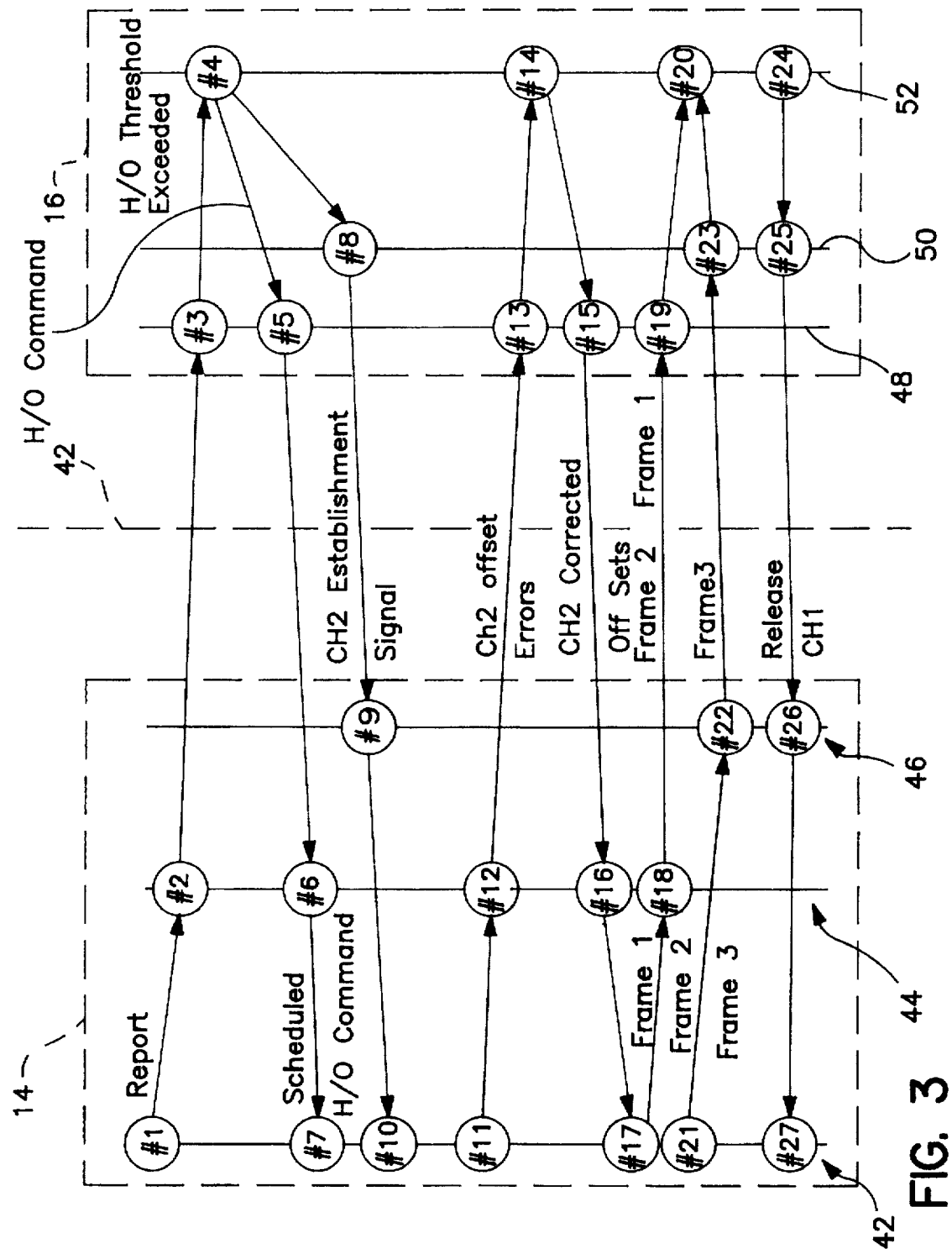
FIG. 3 illustrates a flow diagram of the primary functions carried out between the mobile and ground stations during a handover process according to the present invention.

With reference to FIG. 3, the process is explained hereafter whereby a handover is performed to transfer a communications link between a base station and mobile station from a first channel 26 (FIG. 2) to a second channel 27. The flow diagram of FIG. 3 illustrates a plurality of vertical layers denoted by lines 42–52. Layer 42 corresponds to functions performed by the mobile station controller 34, layers 44 and 46 correspond to the first and second transceivers 30 and 32 within the mobile station 14. Layers 48 and 50 correspond to the first and second transceivers 36 and 38 used within the base station 16. Layer 54 corresponds to functions performed by the controller 40 in the base station 16. The circles within each of layers 42–52 represent nodes at which frames are received/transmitted and at which functions are performed to effect a handover. The arrows between layers 44 and 48 represent command and communications data passed between the mobile and base stations 14 and 16 through the first communications links over the first channel 26 (FIG. 2). The arrows between layers 46 and 50 represent command and communications data passed via the second communications link over the second channel 27.

The example of FIG. 3 merely illustrates the functions involved in a handover. It is assumed that, at node #1, a communications link has already been established over a first channel 26 (corresponding to coverage beam 22). It is further assumed that a call is in progress and frames of communications data (e.g., conversation) are being passed between the parties. At node #1, a second channel 27 has not yet been established. To "establish" a channel, channel parameters must be synchronized between the mobile and base stations for the particular channel. The channel parameters may include a timing offset, frequency, a power level, CDMA coding, encryption coding and the like. These telemetry parameters are explained in more detail in a book entitled "An Introduction to GSM," by Siegmund M. Redl, published by Artech House Publishers, Boston, Mass., (1995), which is incorporated herein by reference.

Beginning at node #1, the mobile station 14 generates a report which is transmitted to the base station 16 over the first channel 26. The report may include telemetry information regarding the status of and environment surrounding the mobile station 14. The telemetry information may include the power level of the present communications link 26 with the satellite 12. The telemetry information may also include frequencies of signals detected by the mobile station 14 from neighboring coverage beams, along with the power levels of these detected signals. With reference to FIG. 1, the telemetry information may include the frequencies and power levels of signals corresponding to coverage beams 60–64. As the mobile station 14 moves closer to a boundary with one of the coverage beams 60–64, the power level of incoming signals from the coverage beam increases. For instance, as mobile station 14 moves closer to the boundary between coverage beams 22 and 64, the report would include telemetry information indicating an increase in the power level of incoming signals at the frequency associated with coverage beam 64.

Returning to FIG. 3, once the report is generated by the controller it is transmitted (node #2) via channel #1 (26 in FIG. 2) to the base station 16. Once the report is received at node #3, the controller 40 analyzes the report at node #4. During this analysis, the controller 40 determines whether the mobile station 14 is about to leave the current coverage beam 22 (node #4). This determination may be performed in one of several ways. For instance, the base station 16 may analyze the power level, within the report, of the current channel 26 detected by the mobile station 14. If the power level of the current channel 26 falls below a minimum threshold, the controller 40 may determine that this power loss is due to the fact that the mobile station is moving out of the coverage beam 22. Hence, if the power level of the current channel falls below the threshold, the controller 40 may determine that a handover will be necessary in the near future.

Alternatively, the controller may independently determine that a handover is necessary by continuously monitoring the position of the mobile station 14 and the position of the associated coverage beam 22. The above identified co-pending application which is assigned to the assignee of the present application and which is incorporated herein by reference describes such a system. This co-pending application describes a system whereby the controller of the ground station continuously monitors the GEO position of the mobile stations and of the corresponding coverage beams. Based on monitoring of the GEO position, the ground station independently determines that the mobile station 14 is approaching a boundary of the coverage beam 22. Thus, the base station 16 independently determines that a handover will be necessary in the near future. Responsive thereto, the ground station initiates the handover process at node #4 (FIG. 3). Thus, if the base station 16 utilizes the process described in the above identified co-pending application, the handover process is initiated at node #4 (FIG. 3) independent of any information received from the mobile station 14. Accordingly, it should be noted that the preferred embodiment may omit the report generated at node #1.

Once the base station 16 determines that a handover is necessary, it generates a handover command which is transmitted between nodes #5 and #6 upon channel #1 (26 in FIG. 2) to the mobile station 14.

The handover command includes all information necessary for the mobile station 14 to schedule or "script" a handover including a scheduled handover time. The handover command also includes estimated new channel parameters. The handover command information is transmitted to the mobile station at a predefined period of time prior to occurrence of the actual handover. The scheduled handover time represents a predefined time value identifying the exact point in time in the future at which the handover will occur. At the scheduled handover time, the base station 16 and mobile station 14 simultaneously switch to the new channel at the new frequency. The handover time is determined by the base station 16 and is set to precisely coincide with the beginning of a new frame of communications data. The scheduled handover time may be set to coincide with the beginning of a "master" frame which may represent the first frame in a multi-frame structure.

By way of example, as illustrated in FIG. 2, the mobile station 14 transmits consecutive frames of communications data (denoted frame 1, frame 2 and frame 3). The scheduled handover time may be set to coincide with the end of frame 2 and the beginning of frame 3. Hence, the handover would occur after frame 2 has been transmitted on channel #1 (26 in FIG. 2) and prior to transmission of frame 3 which will be transmitted on Channel #2. The scheduled handover time is set sufficiently far in the future to afford time for the base and mobile stations to prepare for the handover as explained hereinafter (e.g., 2 or 3 seconds after the base station 16 determines that a handover is necessary at node #4 and transmits the handover command at node #5).

The estimated new channel parameters identify the new channel 27 upon which the mobile station will communicate while located in the new coverage beam. The channel parameters include an estimated frequency, timing offset and power level corresponding to the new channel to be utilized in the new coverage beam. The timing offset is utilized to synchronize the mobile station with respect to the base station. A timing offset may be necessary since mobile stations and ground stations may be found at different distances from the satellite. Depending upon these distances, the delay time and the attenuation of an individual mobile station's signal is likely to be different from the delay and attenuation of any other mobile station's signal. In order to assure proper timing of transmissions from a mobile station, as well as proper reception, a timing delay or offset is measured for each mobile station. The timing offset governs the time at which the mobile station transmits frames of communications data in order to assure that the frames arrive at the ground station at the proper time.

To compensate for attenuation over the varying distances of mobile stations and satellites, the mobile stations are adjusted to transmit at different power levels. Thus, mobile stations located further from the satellite transmit at higher power levels than those located closer to the satellite. The power level control signal governs the power at which frames of communications data are transmitted from the mobile stations. The ground station estimates at node #4 the channel parameters including the new frequency, new timing offset and new power level for the new channel. However, the signals are simply estimates which must be corrected by the mobile station.

In addition, the handover command may include any necessary secondary information, such as any new CDMA and enscription codes to be used with the new channel.

The handover command is received over channel #1 of the mobile station and deciphered by the controller 34 (node #7). Once the mobile station controller 34 determines that a handover has been scheduled to occur at a fixed time in the future, the mobile station records the scheduled handover time. In addition, the mobile station establishes channel #2 at the estimated new frequency, with the estimated timing offset and estimated power level. Thereafter, the mobile station controller 34 monitors channel #2.

Returning to node #4, once the base station 16 transmits the handover command it subsequently transmits an establishment signal over channel #2 (node #8) at the estimated new frequency. The establishment signal is received (node #9) over channel #2 (27 in FIG. 2) and analyzed by the mobile station controller 34 (node #10). The mobile station controller 34 calculates the actual or correct channel parameters for the timing offset, power level and new frequency for channel #2 based on the received establishment signal. The mobile station controller 34 then determines the difference between the estimated and actual/corrected channel parameters. These differences represent offset errors. Once the corrected frequency offset, timing offset and power level are calculated by the mobile station 14, the mobile station reports the offset errors to the base station 16. The offset errors in frequency, power and timing are transmitted as channel #2 parameters at node #12 over channel #1 to the ground station. Alternatively, the corrected frequency, timing offset and power level may be transmitted. Upon receiving the offset errors at node #13, the base station 16 corrects the estimated frequency, power level and timing offset parameters for the new channel. Thereafter the corrected frequency, power level and timing offset parameters are relayed (node #15) over channel #1 back to the mobile station. In this manner, ground stations then obtain the parameters for frequency, timing offset and power level to establish and synchronize a communications link over the new channel #2 for use with the new coverage beam. The mobile station 14 continues to transmit frames of communications data over channel #1 (node #18) to the base station 16 until the scheduled handoff time occurs. Once the scheduled handoff time occurs (node #21 in FIG. 3), the mobile station automatically begins to transmit frames of communications data over channel #2 (node #22) to the base station 16.

In the illustrative example of FIGS. 1–3, the scheduled handoff time occurs between frames 2 and 3. Hence, frames 1 and 2 are transmitted over channel #1 (via nodes #18 and #19). Frame 3 is then transmitted over channel #2 (via nodes #22 and #23). Once the handover has been effected, the base station 16 then transmits a release command over channel #2 (via nodes #25 and #26) to direct the mobile station 14 to release channel #1.

This process is repeated each time the mobile station 14 passes between two coverage beams.

The inventive process provides a scheduled handover procedure which avoids the interrupts and interference caused by long propagation delays in the convention unscheduled handover technique since the handover occurs after the new channel is established. The inventive scheduled handover procedure also speeds the acquisition process of the new channel and the switching process between channels since both channels are used during establishment of the new channel and while the new channel's parameters are calculated. Switching occurs simultaneously and instantaneously at the scheduled handover time. As explained above, the scheduled handover time is set sufficiently far in the future after the base station determines that a handover is necessary to afford adequate time to establish a second channel and to pre-coordinate channel parameters such as timing, power and frequency.

The foregoing description is merely illustrative and is not intended to limit the invention in any manner. Instead, the scope of the invention is defined by the amended claims.

We claim:

1. An apparatus for controlling mobile and base stations during satellite based telecommunications to perform scheduled handovers between first and second communications channels, said apparatus comprising:

a mobile station including at least one transceiver for simultaneously receiving communications data over communications links in said first and second communications channels, at least one transmitter for transmitting communications data over at least one of said first and second communications channels, and an MS controller for selectively connecting a transceiver to said transmitter to transmit communications data over a communications link in at least one of said first and second communications channels; and a base station including at least one transceiver for simultaneously transmitting communications data over first and second channels, and for receiving communications data over at least one of said first and second channels, and a BS controller for maintaining a communications link over at least one of said first and second channels, said MS and BS controllers maintaining a first communications link over said first channel via a satellite, said BS controller determining when a handover is necessary between said first and second channels, said BS controller transmitting over said first channel a scheduled handover time in response to said determination by said BS controller that a handover is necessary, said handover time representing a predetermined future point in time at which a handover will occur;

wherein said MS and BS controllers establish a second communications link in said second channel while simultaneously continuing to transmit communications data over said first communications link in said first channel, said MS and BS controllers switching to said second channel for transmitting communications data at said scheduled handover time.

2. An apparatus according to claim 1, wherein said BS controller sets said scheduled handover time to correspond to a predetermined point in time that coincides with a beginning of a new frame of communications data to be transmitted by said mobile station.

3. An apparatus according to claim 1, wherein said BS controller sets said scheduled handover time such that a time interval from a current time to said scheduled handover time is greater than a round-trip propagation time necessary for a frame of communications data to be transmitted from said base station, to said mobile station and back to said base station.

4. An apparatus according to claim 1, wherein said BS controller transmits in response to said determination that a handover is necessary, along with said scheduled handover time, estimated second channel parameters including at least one of an estimated frequency, an estimated timing offset and an estimated power level for a second communications link to be established over a second channel, said BS controller transmitting said estimated second channel parameters over said second communications link in said second communications channel while simultaneously transmitting communications data over said first communications link in said first communications channel.

5. An apparatus according to claim 4, wherein, during establishment of said second communication link and prior to said scheduled handover time, said MS controller receives said estimated second channel parameters, calculates offset errors in said estimated second channel parameters and transmits over said first channel said offset errors while simultaneously transmitting communications data over said first channel.

6. An apparatus according to claim 1, wherein said base station determines that a handover is necessary when said mobile station passes from a first coverage beam of the satellite to a second coverage beam of the satellite.

7. An apparatus according to claim 1, wherein before said scheduled handover time, said BS controller transmitting, over said second channel, a channel establishment signal directing said MS controller to establish said second communications link over said second channel while simultaneously transmitting communications data over said first channel.

8. An apparatus according to claim 1, wherein said mobile station transmits a report to said base station, said report indicating a power level of incoming signals received over said first communications link.

9. An apparatus according to claim 8, wherein said BS controller determines that a handover is necessary when said power level of said incoming signals to said mobile station fall below a predefined power threshold.

10. An apparatus according to claim 1, wherein said BS controller determines that a handover is necessary based on a geo-position of said mobile station and of a satellite corresponding to said mobile station.

11. An apparatus according to claim 1, wherein said MS and BS controllers establish said second channel by transmitting from said base station estimated parameters for said second channel and in response thereto transmitting from said mobile station offset errors for said second channel in order to synchronize channel parameters for said second channel while simultaneously transmitting communications data over said first channel.

12. An apparatus according to claim 11, wherein said channel parameters include at least one of a timing offset, frequency for said second channel, a power level, CDMA coding and encryption coding.

13. A method for controlling mobile and base stations during satellite based telecommunications to perform scheduled handovers between first and second communications channels, said method comprising the steps of:

maintaining a first communications link over a first channel between mobile and base stations via a satellite;

transmitting and receiving frames of communications data over said first communications link over said first channel;

determining, at the base station, when a handover is necessary between first and second channels;

transmitting a scheduled handover time over said first channel, from the base station to the mobile station, in response to said determination that a handover is necessary, said scheduled handover time representing a predetermined future point in time at which a handover will occur;

subsequent to transmission of said scheduled handover time, establishing a second communications link over a second channel between said mobile and base stations via a satellite while simultaneously continuing to transmit frames of communications data over said first communications link; and at said scheduled handover time, switching to said second channel and thereafter transmitting subsequent frames of communications data over said second channel.

14. A method according to claim 13, further comprising the step of setting said scheduled handover time to correspond to a predetermined point in time between frames of communications data being transmitted by the mobile station.

15. A method according to claim 13, further comprising the step of setting said scheduled handover time such that a time interval from a current time to said scheduled handover time is greater than a round-trip propagation time necessary for a frame of communications data to be transmitted from the base station, to the mobile station and back to the base station.

16. A method according to claim 13, further comprising the step of transmitting, in response to said determination that a handover is necessary, estimated second channel parameters including at least one of an estimated frequency, an estimated timing offset and an estimated power level for a second communications link to be established over said second channel.

17. A method according to claim 16, further comprising the step of, during establishment of said second communications link and prior to said scheduled handover time, transmitting from the mobile station over said first channel, offset errors for said estimated second channel parameters for said second channel.

18. A method according to claim 13, wherein said determination step is based on said mobile station passing from a first coverage beam of the satellite beam to a second coverage beam of the satellite.

19. A method according to claim 13, further comprising the step of, before said scheduled handover time, transmitting over said second channel from said base station a channel establishment signal directing the mobile station to establish said second communications link while simultaneously transmitting communications data over the first channel.

20. A method according to claim 13, further comprising the step of transmitting from the mobile station to the base station, said report indicating a power level of incoming signals received over said first communications channel by the mobile station.

21. A method according to claim 20, wherein said determination that a handover is necessary is based on said power level of incoming signals to said mobile station falling below a predefined power threshold.

22. A method according to claim 13, wherein said determination that a handover is necessary is based on a geoposition of said mobile station and of a satellite corresponding to said mobile station.

23. A method according to claim 13, wherein said establishment step includes transmitting estimated parameters for said second channel over said second channel from the base station and, in response thereto, transmitting from the mobile station offset errors for said second channel over said first channel in order to synchronize channel parameters for said second channel, said steps of transmitting estimated parameters and offset errors being performed while simultaneously transmitting communications data over said first channel.

24. A method according to claim 23, wherein said synchronizing step includes synchronizing a timing offset for said second channel.

25. A method according to claim 23, wherein said synchronizing step includes synchronizing a frequency for said second channel.

* * * * *